United States Patent
Fassnacht

(10) Patent No.: US 8,755,959 B2
(45) Date of Patent: Jun. 17, 2014

(54) METHOD AND CONTROL MODULE FOR CONTROLLING THE DRIVE MODE OF A HYBRID DRIVE TO PREVENT JERKY MOVEMENTS

(75) Inventor: Jochen Fassnacht, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 868 days.

(21) Appl. No.: 12/736,495

(22) PCT Filed: Feb. 11, 2009

(86) PCT No.: PCT/EP2009/051536
§ 371 (c)(1),
(2), (4) Date: Jan. 20, 2011

(87) PCT Pub. No.: WO2009/127452
PCT Pub. Date: Oct. 22, 2009

(65) Prior Publication Data
US 2011/0112708 A1    May 12, 2011

(30) Foreign Application Priority Data
Apr. 14, 2008 (DE) .......................... 10 2008 001 159

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ......... 701/22; 701/1; 701/51; 701/54; 701/65

(58) Field of Classification Search
None
See application file for complete search history.

(56) References Cited

U.S. PATENT DOCUMENTS

| | | | | | |
|---|---|---|---|---|---|
| 5,495,912 | A | * | 3/1996 | Gray et al. ..................... | 180/165 |
| 5,497,941 | A | * | 3/1996 | Numazawa et al. .......... | 237/2 A |
| 5,588,498 | A | * | 12/1996 | Kitada ..................... | 180/65.245 |
| 5,720,690 | A | * | 2/1998 | Hara et al. ..................... | 477/20 |
| 5,786,640 | A | * | 7/1998 | Sakai et al. ..................... | 290/17 |
| 5,969,624 | A | * | 10/1999 | Sakai et al. ................. | 340/636.1 |
| 6,018,198 | A | * | 1/2000 | Tsuzuki et al. ................ | 290/17 |
| 6,077,186 | A | * | 6/2000 | Kojima et al. .................... | 477/3 |
| 6,336,063 | B1 | * | 1/2002 | Lennevi ......................... | 701/22 |
| 6,386,156 | B1 | * | 5/2002 | Stockhausen et al. ..... | 123/90.15 |
| 6,470,853 | B1 | * | 10/2002 | Leone et al. ................. | 123/399 |
| 6,474,303 | B1 | * | 11/2002 | Leone et al. ................. | 123/432 |
| 6,500,089 | B2 | * | 12/2002 | Lasson et al. .................... | 477/3 |
| 6,512,967 | B2 | * | 1/2003 | Ostberg et al. ................. | 701/22 |

(Continued)

FOREIGN PATENT DOCUMENTS

| | | |
|---|---|---|
| DE | 10 2006 008 641 | 8/2007 |
| EP | 0 922 600 | 6/1999 |
| EP | 1 469 195 | 10/2004 |

*Primary Examiner* — Bhavesh V Amin
(74) *Attorney, Agent, or Firm* — Kenyon & Kenyon LLP

(57) ABSTRACT

The drive mode of a hybrid drive is controlled by: detecting a drive mode change signal characterizing a planned drive mode change, and determining a torque shortfall, which would occur due to the drive mode change. Furthermore, the method provides for comparing the torque shortfall with a threshold value, and blocking a drive mode change, if the comparison step reveals that the torque shortfall is above the threshold value. Otherwise, the method provides for: automatically performing a drive mode change according to the drive mode change signal, if the comparison step reveals that the torque shortfall is not above the threshold value.

10 Claims, 1 Drawing Sheet

(56) References Cited

U.S. PATENT DOCUMENTS

| | | | |
|---|---|---|---|
| 6,629,026 B1 * | 9/2003 | Baraszu et al. | 701/22 |
| 6,688,411 B2 * | 2/2004 | Boggs et al. | 180/65.235 |
| 6,736,753 B2 * | 5/2004 | Endo et al. | 477/3 |
| 6,752,226 B2 * | 6/2004 | Naito et al. | 180/65.26 |
| 6,755,266 B2 * | 6/2004 | Lasson | 180/65.235 |
| 6,832,148 B1 * | 12/2004 | Bennett et al. | 701/54 |
| 6,867,509 B1 * | 3/2005 | Takaoka et al. | 290/40 A |
| 6,868,318 B1 * | 3/2005 | Cawthorne et al. | 701/22 |
| 7,223,201 B2 * | 5/2007 | Colvin et al. | 477/5 |
| 7,686,112 B2 * | 3/2010 | Shiiba | 180/65.275 |
| 2003/0033060 A1 * | 2/2003 | Okoshi | 701/22 |
| 2003/0183430 A1 * | 10/2003 | Naito et al. | 180/65.2 |
| 2005/0003928 A1 * | 1/2005 | Niki et al. | 477/5 |
| 2005/0182547 A1 * | 8/2005 | Sah et al. | 701/67 |
| 2005/0252305 A1 * | 11/2005 | Hubbard et al. | 73/860 |
| 2007/0078580 A1 * | 4/2007 | Cawthorne et al. | 701/51 |
| 2007/0149348 A1 * | 6/2007 | Holmes et al. | 477/3 |
| 2007/0191181 A1 * | 8/2007 | Burns | 477/40 |
| 2007/0225888 A1 * | 9/2007 | Morris | 701/51 |
| 2007/0225889 A1 * | 9/2007 | Morris | 701/53 |
| 2007/0272456 A1 * | 11/2007 | Shiiba | 180/65.2 |
| 2011/0112708 A1 * | 5/2011 | Fassnacht | 701/22 |

\* cited by examiner

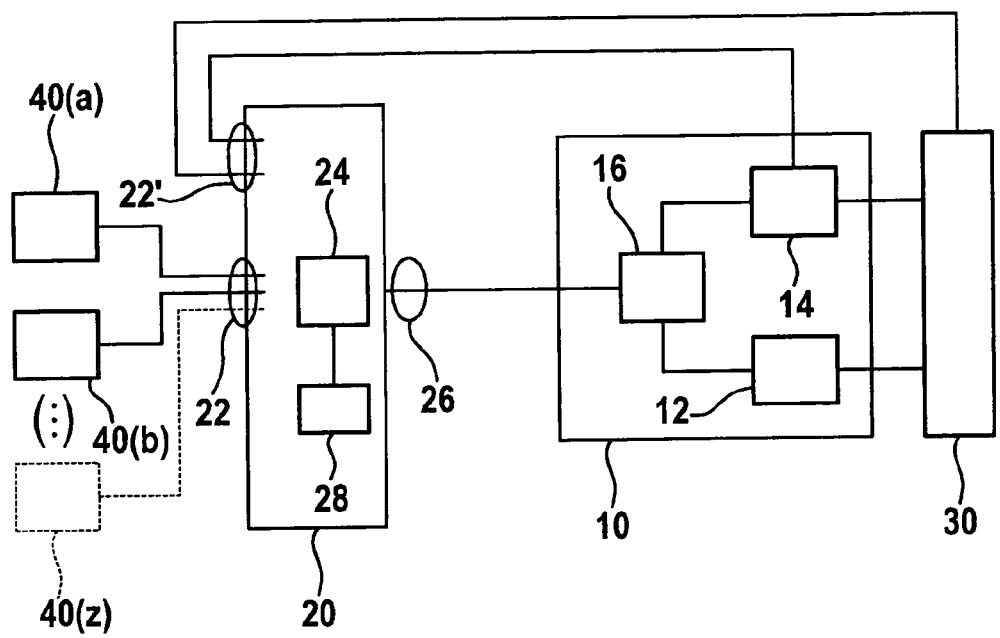

METHOD AND CONTROL MODULE FOR CONTROLLING THE DRIVE MODE OF A HYBRID DRIVE TO PREVENT JERKY MOVEMENTS

BACKGROUND OF THE INVENTION

1. Field of the Invention

The present invention relates to controlling of hybrid drives.

2. Description of Related Art

Hybrid drives combine an electric motor and an internal combustion engine, which form the drive of a vehicle when combined in various ways. Whereas the electric motor is suitable for covering dynamic load peaks and for energy recovery in braking, the internal combustion engine is used to convert fuel and offers a high power output, in particular for high speeds and high driving performance. Depending on the driver's intent and traffic conditions, it may be necessary with regard to efficiency or with regard to the desired driving performance to turn on the internal combustion engine as a drive in addition to the operation of the electric motor or, if both drive systems (electric motor and internal combustion engine) are in use, to turn off the internal combustion engine (for example, to save fuel). Furthermore, there are basically two other drive modes: (1) neither of the two systems is used for the drive, and (2) only the internal combustion engine is used for the drive. These two drive modes (1) and (2) are not the focus of the present invention. The present invention relates in particular to a control for the operating modes in which only the electric motor (only-electrical operation) or the electric motor together with the internal combustion engine (combination operation) is used as the drive system.

In switching between these two operating modes (only-electrical operation, combination operation), jerky movements result. When the internal combustion engine is added while the electric motor is driving, and when the internal combustion engine is turned off when both drive systems (internal combustion engine and electric motor) are in use, jerky movement results due to a sudden drop in driving torque. When the internal combustion engine is added, for example, in parallel hybrid drives in which the electric motor is also used as the starter for the internal combustion engine, the jerky movement is caused by the fact that the electric motor is used not only for the drive but must also provide power for starting the internal combustion engine. The torque required for starting is thus suddenly no longer available for the drive. Furthermore, when the internal combustion engine is stopped, there is a sudden drop in the driving torque of the hybrid drive by the amount previously supplied by the internal combustion engine for the drive. Both cases may result in jerky movements, which definitely have a negative effect on driving performance. This is unpleasant with very heavily loaded vehicles and/or steeply inclined roadways in particular and may also result in hazardous traffic situations, among other things.

However, according to the related art, a change signal, which originates from a driver or from a drive control, is converted directly without estimating the consequences of the change in drive mode.

Published European patent document EP 1469195 B1 describes a method for automatic shutdown of an internal combustion engine, first signaling to the driver the intended shutdown before the automatic shutdown. The driver then has a certain interval of time to actively suppress the planned shutdown of the internal combustion engine by setting an appropriate switch. First, this requires the active involvement of the driver, so the latter may be distracted from the traffic flow, and second, it is up to the driver to judge the consequences of the shutdown, which results in a substantial source of error.

An object of the present invention is therefore to provide a control mechanism for the drive mode of a hybrid drive using which a better driving performance may be implemented.

BRIEF SUMMARY OF THE INVENTION

The present invention allows automatic result-based switching of the drive mode and prevents changes in drive mode which would result in an unwanted driving performance. At the same time the efficiency of the drive is not substantially impaired. The significance of the method according to the present invention in evaluating the driving performance may be illustrated on the basis of the following example. If a heavily loaded P2 hybrid vehicle, for example, is driving on a steep ramp (for example, a garage entrance) at the highest gear ratio, using the electric motor exclusively, then a brief attempt to accelerate would massively impair the driving performance as described below. If the driver attempts to accelerate by depressing the accelerator pedal, the torque of the electrical machine is sufficient only for a slight acceleration but is not sufficient to additionally start the internal combustion engine, then the vehicle would open the clutch on the transmission end to start the internal combustion engine to thereby support the total drive torque with the additional drive torque of the internal combustion engine. Opening the clutch or merely using the electric motor as a starter would result in a jerky movement and in the worst case could even have the unwanted result of the vehicle rolling in reverse. In the same way, shutdown of the internal combustion engine, for example, due to a low driving speed would suddenly reduce the total driving power so that the vehicle would roll back.

However, according to the present invention, a jerky movement and rolling in reverse in particular are easily prevented by detecting the result based on the intensity of the potential jerky movement by determining a torque shortfall to estimate on the basis of the shortfall whether a change in operating mode would result in an excessive movement or a jerky movement which would still be tolerable. The method according to the present invention is capable of preventing a jerky movement caused not only by turning on the internal combustion engine but also by turning off the internal combustion engine. For example, a control may find that with a combined electric motor/internal combustion engine operation, the desired acceleration (cf. gas pedal position) is achievable even when the internal combustion engine is turned off. However, that is not the case with heavily loaded vehicles because according to the related art, the decision about shutting down the internal combustion engine is not made on the basis of the load state, i.e., the load, but according to the present invention the required drive performance and/or the required driving torque is/are ascertained by taking into account the load. Therefore, the desired driving performance at an elevated load, i.e., a high gradient and/or heavy load, for example, is taken into account. The present invention is preferably used in particular for at least temporarily preventing an internal combustion engine from stopping in the appropriately detected situations.

According to the present invention, a drive mode change signal is thus detected; this signal may originate from an operating switch or from a higher-level drive control. The drive mode change signal corresponds to the intent of the controller to induce a change in drive mode and thus characterizes a change in drive mode, which is planned and/or desired by the driver (or by the vehicle controller). Instead of implementing the change in drive mode directly and absolutely, as done in the related art, according to the present invention a torque shortfall, which would occur due to the change in drive mode, is first determined or estimated. According to the present invention, the torque shortfall is compared with a threshold value, the threshold value indicating the tolerance threshold of the driver and thus the desired driving performance. At a very high threshold value, which would occur only with a very great drop in drive torque or with very marked jerky movements, i.e., with a very high torque shortfall, the drive would still operate efficiently, but the driving sensation would be greatly impaired. At a very low threshold level, however, an increase in efficiency may be foregone in favor of an improved driving performance. The height of the threshold value is thus a measure of the quality of the driving performance or efficiency, so that driving performance and efficiency require opposing measures and thus a compromise decision must be made. In preventing the stoppage of an internal combustion engine in particular, this yields a protection against rollback, for example, at (high) threshold values.

According to the present invention, instead of immediately executing the change in drive mode when a drive mode change signal occurs, the change in drive mode is blocked when the torque shortfall is above the threshold value. Otherwise if the threshold value is not exceeded or if the torque shortfall is below the threshold value, the drive mode change signal is relayed to the corresponding control of the hybrid drive in order to execute the corresponding change in drive mode. Furthermore, a change in drive mode is effectively prevented, i.e., blocked only for a predetermined interval of time, for example, when starting of the internal combustion engine is desired.

As already noted, the present invention is focused on two operating modes for application: first, combined operation of the electric motor and the internal combustion engine, in which both contribute toward the drive, and second, the operating mode in which only the electric motor is used for the drive while the internal combustion engine is shut down (or uncoupled). Thus essentially two different transitions which are associated with the drive mode change signal are considered: a first transition from only-electric motor operation to combination operation, or as the second transition, the transition from combination operation to only-electric motor operation. As already noted, simultaneous use of the internal combustion engine and the electric motor for the drive is referred to as combination operation (both motor and engine, i.e., both systems supply driving power) and the drive mode, in which only the electric motor contributes to the drive and the internal combustion engine is shut down, is referred to as only-electric motor operation and the internal combustion engine is shut down and does not contribute to the drive in any other essential manner.

To estimate whether or not the change in drive mode should be blocked, a torque shortfall is determined by detecting a load torque and by detecting a reduction in torque, which is or would be detected when there is a change in drive mode. If the electric motor first operates alone (only-electric motor operation) and the internal combustion engine is to be added according to the change signal, then the reduction in torque is determined essentially by the starting torque, which is transmitted by the electric motor to the internal combustion engine to start the internal combustion engine. It may be seen that the amount of the starting torque is transmitted to the internal combustion engine. In addition, a torque shortfall, which is the result of uncoupling the electric motor from the output, also occurs as a torque reduction if this is provided, and if the starting operation provides for the exclusive connection between the internal combustion engine and the electric motor and for the separation of the output via the clutch. The torque shortfall is not considered as the ultimate factor here but instead may also include additional torque shortfalls associated with the change in drive mode.

According to the present invention, the determination of the torque shortfall includes an estimation or "modeling" of the entire system, taking into account a load torque, i.e., a load situation of the drive. The load torque, i.e., the load situation, reflects the torque (or the additional increase in torque) which is necessary to provide a speed or a change in speed of the vehicle. To do so, a speed (or a change in speed) is provided by the driver or the accelerator pedal or by a controller, for example, an active drive control. The controller next ascertains whether the new speed or the change in speed would result in a change in drive mode. According to the present invention, the consequences of the (planned) change in drive mode are estimated as described below and, if necessary, the change in drive mode is blocked according to the present invention to prevent a jerky movement.

The load torque is used for "modeling" and is used to provide the increase in drive torque supplied by the hybrid drive as required for the change in speed, for example, to reduce or completely compensate for the torque shortfall. In particular, a gradient of the roadway, a load (weight) of the vehicle, or a combination thereof is provided and used for this purpose. The load torque may be a variable, which corresponds to a torque required for providing the change in speed or for maintaining a speed.

The increase in drive torque may also be smaller than the torque shortfall. The increase in drive torque may be a predetermined value, which is set to detect the particular change in speed so that the load torque is detected. In combination with or as an alternative to active detection of the load torque by increasing the drive torque and detecting the particular difference in the change in speed, i.e., the increase in acceleration, the load is preferably estimated as explained below, i.e., for example, by detecting the gradient, the irregularities in the roadway, the vehicle mass by ascertaining additional loads, air resistance, friction torques, and similar causes of loads. The load torque preferably reflects instantaneous loads which influence the momentary driving operation. These variables, ascertained to detect the load, may be measured (for example, the road gradient, flatness of the roadway) or may be estimated/calculated (for example, estimating the additional load by detecting the seat occupancy/use of the trailer clutch). In general, the load torque is a measure of the load on the hybrid drive due to the movement of the vehicle.

A suitable embodiment of the method includes increasing the load torque, which reflects the required load torque or output torque by a corresponding amount, which corresponds to the increase in resistance due to, for example, the roadway gradient, irregularities in the roadway or other effects and includes blocking, i.e., preventing shutdown of the internal combustion engine at a load torque beyond a certain amount. The torque shortfall, which is compared with a threshold value according to the present invention, may thus be equated with a value reflecting the load torque before the comparison. According to the present invention, (increased) load torque may be compared with a certain amount (for example, a maximum amount) instead of a comparison of the torque shortfall, the blocking step being performed when the load torque is above a certain amount (for example, a predefined amount).

If the drive mode change signal characterizes the second transition, i.e., the transition from combination operation to only-electric motor operation, then the drive torque shortfall corresponds to the torque, which is contributed by the internal combustion engine to the drive before the change, and which is no longer available after shutdown of the internal combustion engine. In particular applying this method to the second transition results in a great improvement in driving safety because it prevents a jerky movement and/or rolling in reverse, which would occur due to a sudden reduction in torque (as a result of stopping the internal combustion engine despite inadequate power of the electric motor). If necessary, in addition to the failure of torque production by the electric motor, additional clutch friction effects are also to be taken into account as torque shortfall in the advance calculation/ascertainment of the expected torque shortfall. As already noted, all torques which are associated with a change in drive mode are to be taken into account as the torque shortfall. In particular an inclination value which has been ascertained is taken into account, indicating a measure of the torque load due to the weight of the moving vehicle which is added to the torque demand (accelerator pedal/cruise control/drive control), if necessary.

According to an example embodiment of the present invention, the torque shortfall is provided as the sum of the load torque and of the starting torque (in the case of the transition from only-electrical operation to combination operation) or as the sum of the load torque and of the drive shortfall torque (in the case of the transition from combination operation to only-electrical operation). If the change in drive mode is linked to uncoupling of the drive (even if only temporarily), then the torque shortfall in this case determines the intensity of rolling in reverse or deceleration (second transition) or the intensity of the jerky movement (first transition). If the load torque may also be compensated continuously by the electric motor even during the change in the drive mode, then the torque shortfall may be provided as starting torque or as drive torque shortfall or the threshold value may preferably be modified by a corresponding basic value. The basic value of the threshold value in this case corresponds to the torque shortfall, which is already compensated by the electric motor.

The load torque, which may be provided as a component of the torque shortfall, is preferably detected by the tilt of the vehicle being ascertained, the vehicle tilt being detected by a tilt sensor which is provided for this purpose, is detected via the angle signal of a rollover detector, which is already provided, or via an angle signal of an antitheft device. In the case of a rollover detector or antitheft device, components already provided in the vehicle may be used, and the angle signal used or generated there may be used again here. In this sense, the angle sensors of the rollover detector or antitheft device may be used to detect the angle signal in combination with their function as angle sensors for the rollover detector or for the antitheft device. In the same way, an angle signal of the rollover detector or of the antitheft device, which may be used, is used in calculation processes within the antitheft device or the rollover detector. The two signals may be combined, for example, to provide a redundant signal or the signals may be combined, weighted according to accuracy or reliability.

Furthermore, the load torque may be detected by ascertaining the inertia of the vehicle. In this case, an acceleration and an associated drive torque are preferably detected. The quotient of the acceleration and the drive torque required for this provides a measure for the load due to the vehicle mass or a measure for the additional load. The acceleration signal may be generated via a sensor provided specifically for this purpose or may be provided by a traction control, an ESP control, an engine control system or a drive control, for example, by the fact that the sensor of the particular component already provided is also used or by the fact that signal values provided in the particular controls and/or regulators are tapped and/or detected.

To detect the inertia of the vehicle to thereby provide an estimate of the load torque, it is possible to use signals from sensors in vehicle seats, where these signals are also used for other load detection and/or for verification of whether the seatbelt of a person sitting in the vehicle seat has been fastened. Since the verification of whether the seatbelt of a person sitting in a vehicle seat has been fastened also includes a determination of the load on the seat to ascertain whether the seat is occupied at all, this occupancy signal may be used in the above sense as a load (estimation) signal. Alternatively or in combination with that, a signal which characterizes the coupling of a trailer, for example, a signal which characterizes the fact that a plug for a trailer light has been connected may be evaluated for this purpose. Furthermore, mass or inertia signal values of a traction control, an ESP control or an engine control system, which use such inertia values for their own purposes, may be used.

The use of a "full load switch" which must be operated by the driver may also be used to determine an increased vehicle load. If such a full load signal which has been input (or provided by a controller) is delivered, a predetermined load torque and/or a predetermined load state is assumed, which is added if necessary to the load torque which has already been detected or estimated. The load torque in this case corresponds to a full load of the vehicle. Another alternative for forming the load signal is to use terrain or road gradient data from navigation systems or traffic guidance systems to form the load signal. Thus the roadway inclination (preferably currently acting on the vehicle) from which the load torque is obtained is calculated from data from the navigation system or traffic guidance system.

In the same way, the total drive torque delivered may be obtained from corresponding performance values of a drive control, a traction control, an ESP control, or an engine control system. In the case of using a seat occupancy signal or a trailer coupling signal, preset estimated values may be used, for example, a standard scenario, a best case scenario or a worst case scenario. A standard scenario would be, for example, the assumption of 75 kg per occupied seat; a worst case assumption would be, for example, to assume a maximally loaded attached trailer; and a best case scenario would be to assume a limit weight beyond which a vehicle seat sensor would indicate occupancy.

Furthermore, to detect the load torque, a roadway condition value may be detected, for example, by a traction control, an ESP control, or an engine control system, which take into account the roadway roughness in their function as safety module or control module. Furthermore, a preset standard value or a maximum value may be assumed if an off-road switch is operated, permitting adjustment of corresponding driving properties by an operator. If the off-road switch is activated, it is then assumed according to the present invention that a high load torque prevails, based on the roadway condition. The speed of the vehicle may be ascertained as an additional component of the load torque to also include the load due to air resistance.

The aforementioned options for determining the load torque are preferably individual components, which may be combined and weighted, for example, by adding a standard value, when the off-road switch is activated, to a standard weight value of an occupied vehicle seat, and to an angle signal which indicates the roadway gradient. In the case of a change in drive mode from combination operation to only-electrical operation in particular, the charge state of the energy accumulator device of the electric drive may be taken into account in ascertaining the torque shortfall. The greater the depletion of the energy accumulator device (traction battery), the less the drive power and/or drive torque is available in only-electrical operation. Furthermore, a drive torque which is required at the moment and by which the drive shortfall is increased is preferably taken into account.

Furthermore, the desired acceleration which is provided by the accelerator pedal position is preferably taken into account. Either the load torque or the threshold value may be altered here because, for example, when the accelerator pedal has been greatly depressed there is also a marked jump in torque when there are changes in drive mode. Thus, for example, the set angle of the accelerator pedal may be inversely proportional to the threshold value, so that when the accelerator pedal is greatly depressed, the threshold value is additionally reduced to prevent a marked jump in torque, which is associated with a high acceleration, even when the load torque is otherwise lower. The threshold value is preferably between zero and a value which stands for a marked jerky movement. The jerky movement may be represented by the amount of the reduction in speed associated with the drive mode or by an associated time-based reduction in speed (i.e., negative acceleration). Since the torque shortfall is compared with the threshold value, a change in torque shortfall may also be reflected similarly in an (inverse) change in the threshold value or vice versa. A comparator or a suitably programmed microprocessor is preferably used for the comparison.

The drive mode change signal may be generated by an operating switch, which is operated by a driver, to initiate a change in operating mode. The method according to the present invention prevents changes in operating mode which are desired by the driver and are not adapted to the present load or the acceleration to be provided. In addition, the drive mode change signal may occur within or be output by a vehicle controller or an engine control system, which controls the operating mode of the hybrid motor according to an operating program. Such controls preferably also provide clutch operations and starting operations and control the corresponding components (in the case of starting the electric motor or, if necessary, a starter provided for this purpose). The engine control systems process settings, measured values and states of the drive from sensors or input devices according to a sequence program.

If only-electric motor operation is to be switched to combination operation (first transition), the electric motor is used briefly as a starter for the internal combustion engine. To estimate the torque transmitted from the electric motor to the internal combustion engine in the starting operation, preset values may be used, these values being adapted based on the temperature or age of the internal combustion engine, the angle setting and similar operating parameters of the internal combustion engine, if necessary. Experience has shown that if a value of one of these operating parameters increases the required starting torque of the internal combustion engine, then the starting torque to be assumed may be correspondingly increased. As already pointed out, the threshold value may also be correspondingly modified on the basis of the comparison for compensation of these values, namely in the opposite direction from the change in the torque shortfall, which includes the starting torque.

In the first transition, the change is preferably not blocked permanently but instead only for a predetermined interval of time, which begins with detection of the operating mode change signal or with the blocking. The addition of the internal combustion engine to the production of torque is therefore not blocked continuously, regardless of other states or variables, which influence the method according to the present invention. Furthermore, the blocking of starting of the internal combustion engine when there are torque demands, which are much greater than zero or greater than a predetermined torque demand threshold value, is preferably canceled or terminated. For example, at an accelerator pedal position, which corresponds to a great torque demand, it is thus ensured that the method does not block the start of the internal combustion engine, although this is obviously desired (due to the great torque demand). In this way, the internal combustion engine is blocked only at a low torque shortfall to prevent a jerky movement, which would result due to the starting operation or due to operation of the clutch. If the torque shortfall is definitely greater (i.e., the electric motor is unable to apply the required drive torque by itself), then the drive mode change is allowed. This may be implemented as the torque shortfall window, for example, which forms the basis of the comparison and outside of which the drive mode change is allowed. In particular the upper limit (implemented, for example, by an additional greater threshold value, referred to below as the internal combustion engine start threshold value) is not used to block the start of the internal combustion engine if it is apparent on the basis of a great torque shortfall that the internal combustion engine must support the electric motor to prevent a drop (i.e., a decline in speed) or to prevent it from rolling in reverse. Within the window, a drive mode change is blocked according to the present invention in order to prevent a jerky movement caused by clutching/starting. Furthermore, the upper limit prevents the internal combustion engine from not being started despite a high drive torque demand, for example, for acceleration in a passing maneuver, and the electric motor having to apply the increased drive torque by itself. If it is ascertained in particular that the electric motor cannot (load limit exceeded) or should not (operation near maximum power not desirable) apply the (increased) drive torque by itself, then the blocking is canceled again. The mechanisms mentioned above for canceling the blocking may be provided individually or in combination. Instead of the (additional) internal combustion engine start threshold value, the step of comparison and/or the threshold value according to the present invention, which is already present, or the torque shortfall may also be manipulated or modified to implement the upper limit.

For example, if there should be a greater gradient (and thus a greater torque shortfall), then the torque shortfall exceeds the additional threshold value, i.e., the internal combustion engine start threshold value, so that exceeding this value results in cancelation of the blocking according to the present invention again because the greater gradient necessitates starting of the internal combustion engine, even accepting a jerky movement due to the start/coupling. This is also true of a greater torque demand. The internal combustion engine start threshold value is preferably reduced at a low charge state of the energy accumulator device which supplies power to the electric motor. Furthermore, the torque shortfall may be "artificially" reduced (modified) within the context of the comparison to facilitate the internal combustion engine start by canceling the blocking. The internal combustion engine first relieves the load on the electric motor and also increases the charge state by charging. For the first transition, the threshold value (=blocking threshold value), which is used in general according to the present invention, and the internal combustion engine start threshold value (=upper limit), which is greater than the blocking threshold value, thus form a window in which the method according to the present invention provides blocking of the drive mode. The reserve torque, by which the drive torque of the electric motor may still be increased, is preferably derived from the charge state of the electrical energy accumulator device, which supplies power to the electric motor. The internal combustion engine start threshold value is preferably reduced to this extent, the closer the charge state is to the "empty" state in order to facilitate or allow an internal combustion engine start in support of the weak electric drive.

Instead of introducing an internal combustion engine start threshold value to enable an internal combustion engine start (which is necessary because the electric motor is too weak), the threshold value (blocking threshold value) may be "artificially" increased beyond a limit torque shortfall, so that the torque shortfall drops again below the threshold value and the condition for the change in drive mode is met. The limit torque shortfall described here is above the blocking threshold value by a minimum interval, which defines the width of the window and is equal to or less than the reserve range (=reserve torque) of the electric motor between the currently supplied torque and the maximum torque which is maximally suppliable by the electric motor (together with its electrical energy accumulator device) under the prevailing conditions. In other words, if the torque shortfall is greater than the power, which may be applied by the electric motor alone (depending on the electric motor temperature, the charge state and the discharge current of the electrical accumulator, then according to the present invention, the blocking of the start of the internal combustion engine is canceled again. The increase in the threshold value beyond the limit torque shortfall which is performed for this purpose preferably corresponds to the difference in the maximum torque to be supplied by the electric motor and the torque demand beyond that. The increase, i.e., the increase value, may be associated with a multiplication factor greater than 1, so that the blockage is canceled even in the case a minor increase value and the drive mode is altered. In the same way, the (preferably overproportionate) increase in the threshold value may correspond to the difference between a certain torque shortfall and the reserve torque of the electric motor (=difference between the instantaneous torque and the maximum possible torque). The proportionality factor is greater than 1, for example, 2 or greater than 2. Instead of increasing the threshold value, the torque shortfall which is used for the comparison (comparative torque shortfall) may also be reduced in comparison with the specific torque shortfall if the specific torque shortfall exceeds a limit (for example, the limit torque shortfall). In other words, instead of introducing another threshold value, the step of comparison may be manipulated, i.e., either by artificially increasing the threshold value beyond a limit torque shortfall or by reducing the parameter using which the threshold value is compared after exceeding the limit torque shortfall. The limit torque shortfall corresponds to a torque shortfall, which necessitates the start of the internal combustion engine to support the electric motor, because the electric motor would have to operate in an undesirably high operating range in the absence of starting the internal combustion engine, or the required power of the electric motor would be above the maximum power of the electric motor.

The intervention into the comparison step described here allows a simpler implementation than a single comparison step. Alternatively, a second comparison step may be provided, the results of which will override the result of the comparison step already defined, the comparison step ascertaining whether or not the torque shortfall may be made up by the reserve torque of the electric motor. If the torque shortfall is equal to or greater than the reserve torque, then the blocking is canceled and a drive mode change is performed. Within the second comparison step, which is performed only for the first transition, the reserve torque may still be reduced by a safety margin to prevent the electric motor from operating at its maximum power, although the internal combustion engine may be activated and the load on the electric motor would be relieved. In other words, when the reserve torque is provided, a power which is lower than the maximum power of the electric motor by a certain amount may be assumed as the basis. This cancellation of the blocking, which is preferably provided only for the first transition and not for the second transition, may be implemented by: a detection element, which detects the drive mode change signal, and in the event of the first transition, activates the means for cancellation, a memory or an input for the upper limit (limit torque shortfall, a comparator for determining whether the specific torque shortfall is above the limit torque shortfall, and a subtractor, which artificially (and overproportionately) reduces the torque shortfall used for the comparison in comparison with the specific torque shortfall, or using an adder, which artificially increases the threshold value used for the comparison. Instead of manipulation of the comparison by an adder or subtractor, a comparator may be used, which operates as a window comparator for the case of the first transition and triggers the blocking according to the present invention for the torque shortfalls within a window (defined by the threshold value as the lower limit, and the limit torque shortfall above that defined as the upper limit). For the case of the second transition, the comparator operates as a threshold value comparator which provides the blocking of the transition to the only-electrical operation in the event of torque shortfalls above the threshold value. For the case of the second transition, no comparison with a limit torque shortfall is provided. Therefore, either the comparison mode of the comparator may be modified or the limit torque shortfall, i.e., the upper limit of the window comparator, may be raised to a value which is actually never achievable for deactivation in the case of the second transition. To this end, an adder may be used, which in the case of the second transition artificially raises the limit torque shortfall to a value which is actually never achievable before it is used for comparison.

The method according to the present invention may be implemented by a control module, which may be provided via hardware, software or a combination thereof. For example, the control module is provided by a program item running in a control device, which also implements other functions, for example, engine control. According to the implementation, the module includes input and output interfaces in the form of physical or logic interfaces (in hardware implementations) or in the form of function heads or software module heads, which allow a transfer of parameters (in the case of software implementation). The software or software components may run on a separate microprocessor or may run on a processor which already includes functions of other control components, for example, functions of the engine control.

The hybrid drive triggered according to the present invention preferably includes one or more electric motors, the total drive power of the electric motors being considered as the drive power. For example, one electric motor may be used for each drive wheel, with all of the electric motors being triggered in their total power according to the present invention. To control the drive power or the drive torque, the torque generated by the electric motor may be used by controlling the electric motor itself or a clutch may be activated to control the power or the torque delivered by the electric motor to the output, or a combination thereof.

BRIEF DESCRIPTION OF THE DRAWING

FIG. 1 shows a function block diagram to illustrate the method according to the present invention.

DETAILED DESCRIPTION OF THE INVENTION

FIG. 1 shows a function block diagram illustrating the control of a hybrid drive 10 by a controller 20 according to the present invention.

The hybrid drive includes an internal combustion engine 12 and at least one electric motor 14, both of which are designed to drive the vehicle. Internal combustion engine 12 and electric motor 14 are connected by a clutch element 30 for transmitting torque and selecting the drive mode. In the case of a start, this clutch element connects the shaft of the electric motor directly to the shaft of internal combustion engine 12. The diagram in FIG. 1 merely assigns functions and does not represent any specific mechanical connections. Controller 20 receives signal values from components 40(a)-40(z) via an input interface 22. Components 40(a-z) may be force sensors or gradient sensors, which are provided specifically for this purpose and measure a roadway inclination or a force, from which it is possible to determine the load of the vehicle. Components 40(a)-(z) may also be components having other functions provided in the vehicle, for example, an antitheft control, which supplies an angle of inclination value, a seat occupancy sensor, which indicates the occupancy of vehicle seats, or an ESP control, which indicates a load value as an interim result, for example, or a friction value, which indicates the additional friction due to an uneven road substrate. Furthermore, there is a transmission line between electric motor 14 and controller 20, transmitting a reserve torque from electric motor 14 to controller 20. The reserve torque corresponds to the nominal maximum power of the electric motor minus the operating power delivered at the moment and thus corresponds to the buffer, which is still available for the drive through appropriate upregulation of the electric motor. Alternatively, instead of a reserve torque, an operating parameter or a group of operating parameters of electric motor 14 may also be transmitted to controller 20, from which the reserve torque may be ascertained. Appropriate operating parameters include, for example, phase-triggering parameters, cross-current specifications, stator-current specifications, sampling ratios, regulating variables and similar power-triggering parameters of the electric motor.

Furthermore, clutch element 30 is connected to controller 20 via a transmission line, which transmits the drive torque supplied to allow controller 20 to establish a relationship between the detected drive torque and the acceleration thereby achieved in order to determine how heavily the vehicle is loaded or to ascertain the load based on the total mass of the vehicle. Thus, in addition to coupling the electric motor to the internal combustion engine for the starting operation, clutch element 30 may additionally provide coupling of the electric motor, the internal combustion engine, or both systems to a drive. Instead of having the drive torque detected by clutch element 30, internal combustion engine 12 and/or electric motor 14 may also be used. Furthermore, a shared control 16 of the two drive units may be used to provide the drive power supplied in the load state in the form of signals.

Furthermore, a connection is provided between controller 20 and drive 10, transmitting the control signal provided in controller 20 to shared controller 60 of both units 12 and 14. As already pointed out, some signals are input from components 40(a)-(z) to the controller, and through the transmission lines between electric motor 14 and controller 20, and clutch element 30 and controller 20. The inputs of these transmission lines may therefore be regarded as input interface 22'. The signals input into controller 20 are preferably processed by a central processing unit 24, which relays corresponding control signals via an output interface 26. Processing unit 24 is responsible for the analysis, comparison and conversion, if necessary, of the input signal values in order to trigger hybrid drive 10 by the method according to the present invention. Controller 20 also includes a unit 28 for providing the threshold value, which may be stored, for example, and modified as described above, if necessary. To retrieve the threshold value in unit 28, there is a connection between unit 28 and central computation unit 24.

Except for the connections between internal combustion engine 12 and/or electric motor 14 and clutch element 30, which are mechanical, all the connections are preferably electrical and may be implemented via individual lines or by using a bus system.

What is claimed is:

1. A method for controlling a drive mode of a hybrid drive of a vehicle having an internal combustion engine and at least one electric motor, comprising:
    detecting, by a control unit, a drive-mode-change signal characterizing a planned drive mode change;
    determining, by a computation unit, a torque shortfall which would occur due to the planned drive mode change, wherein the determination of the torque shortfall includes detecting a load torque, wherein the load torque corresponds to the load on the hybrid drive due to the movement of the vehicle, taking into account roadway properties;
    comparing, by the computation unit, the determined torque shortfall with a predetermined threshold value;
    blocking, by the computation unit, the planned drive mode change if the determined torque shortfall is greater than the threshold value; and
    automatically performing, by the computation unit, a drive mode change according to the drive mode change signal if the determined torque shortfall is less than the threshold value.

2. The method as recited in claim 1, wherein the drive-mode-change signal characterizes one of: (i) a first transition from electric-motor-only operation to a combination operation involving both the internal combustion engine and the electric motor; or (ii) a second transition from the combination operation to electric-motor-only operation.

3. The method as recited in claim 2, wherein, if the drive-mode-change signal characterizes the first transition, the step of determining the torque shortfall includes:
    providing a starting torque which occurs on the internal combustion engine in a startup operation of the internal combustion engine;
    ascertaining a reserve torque which may additionally be supplied by the electric motor until reaching a maximum power; and
    providing the torque shortfall as the sum of the load torque and the starting torque minus the reserve torque.

4. The method as recited in claim 2, wherein, if the drive-mode-change signal characterizes the second transition, the step of determining the torque shortfall includes:
    detecting a drive shortfall which corresponds to an internal combustion engine drive torque supplied by the internal combustion engine;
    ascertaining a reserve torque which may additionally be supplied by the electric motor until achieving a maximum power, wherein the ascertaining includes: (i) ascertaining a charge state of an electrical accumulator device supplying traction power to the electric motor, and (ii) providing one of a normal operating range of the electric motor or a currently allowable maximum operating range; and providing the torque shortfall as the sum of the load torque and the drive shortfall minus the reserve torque.

5. The method as recited in claim 1, wherein the detection of a load torque is achieved by one of:

ascertaining the tilt of the vehicle by using at least one of a tilt sensor, an angle signal of a rollover detector, and an angle signal of an antitheft device;

detecting an acceleration by using an acceleration signal of one of a traction control, an ESP control, an engine control system or an acceleration sensor, and by ascertaining at least one of a drive power, a drive power control signal, and a drive torque inducing the detected acceleration;

ascertaining a mass value by using one of a seat occupancy signal characterizing the occupancy of a vehicle seat within the vehicle, a trailer coupling signal characterizing the coupling of a trailer to the vehicle, a mass value of one of a traction control, an ESP control or an engine control, or an inertia value of a traction control, an ESP control or an engine control system;

ascertaining one of roadway properties or a roadway condition value of an off-road switch, wherein the roadway condition value is used for adjusting one of the driving behavior of the vehicle, the traction control or the ESP control;

ascertaining data reflecting at least one of the roadway inclination and terrain properties, the data being generated by one of a navigation system, a GPS-supported navigation system or a traffic control system; or ascertaining the speed of the vehicle and the drive torque necessary to maintain the speed, taking into account at least one of air friction and rolling friction.

6. The method as recited in claim 1, wherein the threshold value is between zero and a value corresponding to a torque jump in the event of the change in the drive mode, resulting in a reduction in speed which is below a predetermined value.

7. The method as recited in claim 1, wherein the drive-mode-change signal originates from one of: (i) an operating element configured to be used by an operator to adjust the desired drive mode, or (ii) a drive controller controlling the drive mode on the basis of one of settings, measured values, states of the vehicle, or states of components of the vehicle.

8. The method as recited in claim 1, wherein the starting torque is provided by estimating the torque required on the basis of one of the internal combustion engine temperature, outside temperature, or internal combustion engine operating properties for performing a successful starting operation of the internal combustion engine.

9. The method as recited in claim 1, wherein:

if the drive-mode-change signal characterizes the first transition, the step of blocking is terminated one of: (i) at the latest after a predetermined time interval has elapsed, wherein the predetermined time interval begins with one of blocking or detection of the drive-mode-change signal; (ii) at the latest with the detection of a charge state of an energy accumulator device supplying traction power to the electric motor, the charge state being below a predetermined minimum charge state; or (iii) at the latest with detection of a torque requirement above a predetermined torque requirement threshold value;

if the drive-mode-change signal characterizes the second transition, the step of blocking is canceled if one of: (i) a sum of the torque shortfall and a drive torque instantaneously generated by the electric motor is above a maximum drive torque to be supplied by the electric motor, wherein the maximum drive torque is one of predefined or determined based on the charge state of the energy accumulator device; or (ii) the torque shortfall is above a predefined upper limit.

10. A control unit for controlling a drive mode of a hybrid drive of a vehicle having an internal combustion engine and at least one electric motor, comprising:

an input interface configured to input a drive-mode-change signal characterizing a planned drive mode change, a load torque and a reduction torque, wherein the reduction torque includes at least one of a starting torque and a drive torque shortfall;

an output interface configured to output a drive mode control signal to control the drive mode of the hybrid drive; and a computation unit connected to the input interface and the output interface, wherein the computation unit is configured to:

determine the torque shortfall which would occur due to the planned drive mode change, wherein the determination of the torque shortfall includes detecting the load torque, wherein the load torque corresponds to the load on the hybrid drive due to the movement of the vehicle, taking into account roadway properties;

compare the determined torque shortfall with a predetermined threshold value;

block the planned drive mode change if the determined torque shortfall is greater than the threshold value; and automatically perform a drive mode change according to the drive-mode-change signal by controlling the output of the drive mode control signal if the determined torque shortfall is less than the threshold value.

* * * * *